(12) United States Patent
Vetter et al.

(10) Patent No.: US 9,643,792 B2
(45) Date of Patent: May 9, 2017

(54) POSITIONING TABLE

(71) Applicant: AMS Solutions Inc., Enderby (CA)

(72) Inventors: Richard Anthony Vetter, Enderby (CA); Ronald Henry Pobuda, Enderby (CA); Roland William Davyduke, Enderby (CA)

(73) Assignee: AMS SOLUTIONS INC., Enderby, British Columbia (CA)

( * ) Notice: Subject to any disclaimer, the term of this patent is extended or adjusted under 35 U.S.C. 154(b) by 0 days.

(21) Appl. No.: 14/952,978

(22) Filed: Nov. 26, 2015

(65) Prior Publication Data

US 2016/0145053 A1 May 26, 2016

Related U.S. Application Data

(60) Provisional application No. 62/085,166, filed on Nov. 26, 2014, provisional application No. 62/185,368, filed on Jun. 26, 2015.

(51) Int. Cl.
| | |
|---|---|
| *B65G 47/24* | (2006.01) |
| *B27C 5/06* | (2006.01) |
| *B65G 47/244* | (2006.01) |
| *B65G 47/52* | (2006.01) |
| *B27C 1/12* | (2006.01) |
| *B65G 13/10* | (2006.01) |
| *B65G 13/04* | (2006.01) |
| *B27C 5/02* | (2006.01) |

(52) U.S. Cl.
CPC ............. *B65G 47/244* (2013.01); *B27C 1/12* (2013.01); *B27C 5/02* (2013.01); *B27C 5/06* (2013.01); *B65G 13/04* (2013.01); *B65G 13/10* (2013.01); *B65G 47/52* (2013.01)

(58) Field of Classification Search
CPC ........ B65G 13/10; B65G 39/04; B65G 39/12; B65G 47/244; B27C 5/06
See application file for complete search history.

(56) References Cited

U.S. PATENT DOCUMENTS

| | | | |
|---|---|---|---|
| 3,837,550 A | 9/1974 | Levy | |
| 3,978,975 A * | 9/1976 | Herbes | B64D 9/00 198/782 |
| 4,589,542 A * | 5/1986 | Steadman | B64D 9/00 198/782 |
| 4,696,386 A | 9/1987 | Lem | |
| 5,029,693 A | 7/1991 | Williams | |
| 5,547,069 A * | 8/1996 | Pritchard | B64D 9/00 198/782 |
| 5,921,374 A * | 7/1999 | Takino | B65G 13/10 193/35 MD |
| 7,040,478 B2 * | 5/2006 | Ehlert | B65G 13/10 198/369.4 |
| 7,673,738 B2 * | 3/2010 | McConnell | B60P 1/52 198/782 |

(Continued)

*Primary Examiner* — Thomas Randazzo
(74) *Attorney, Agent, or Firm* — Antony C. Edwards

(57) ABSTRACT

A material handling system includes an array of independently controlled positioning devices, a positioning table which support and manipulate workpiece attributes such as position, orientation, velocity and/or acceleration of workpieces on the table. The positioning devices are arrayed such that no single positioning device supports more than one workpiece at a time, thereby allowing for simultaneous and independent control of each workpiece.

19 Claims, 16 Drawing Sheets

(56) References Cited

U.S. PATENT DOCUMENTS

| | | | |
|---|---|---|---|
| 8,474,596 | B2 | 7/2013 | Wolkerstorfer et al. |
| 9,248,981 | B1 * | 2/2016 | Skoretz ................. B65G 13/10 |
| 2005/0040009 | A1 | 2/2005 | Ehlert |
| 2014/0116841 | A1 * | 5/2014 | Wilkins ............... B65G 13/065 |
| | | | 198/369.1 |
| 2015/0197031 | A1 | 7/2015 | Kennedy et al. |
| 2015/0375939 | A1 * | 12/2015 | Garehan ................ B65G 13/10 |
| | | | 193/36 |

* cited by examiner

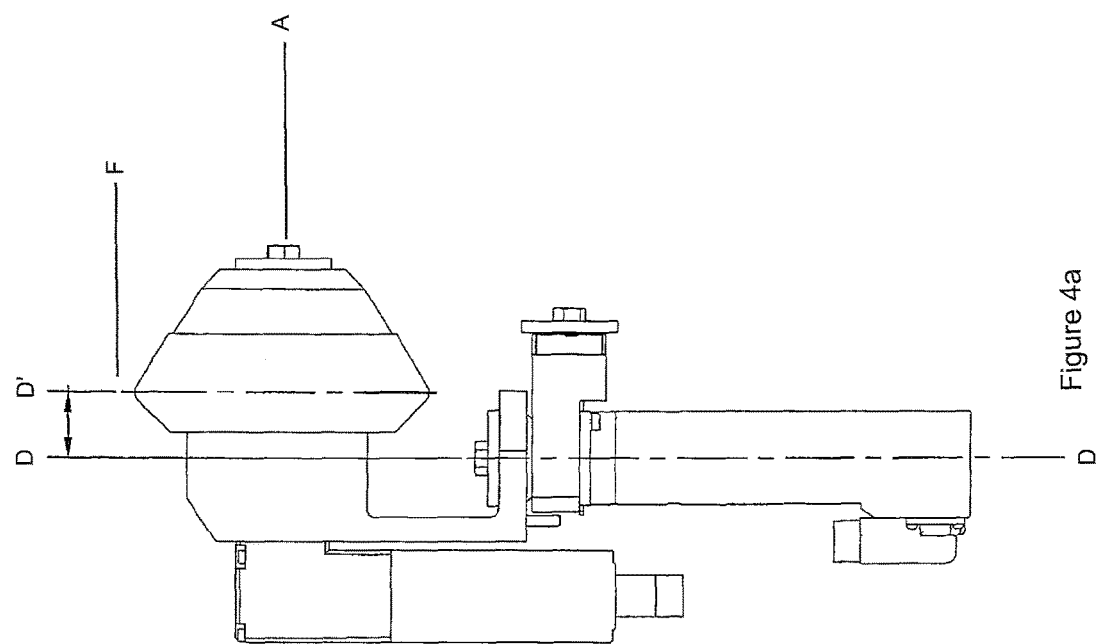
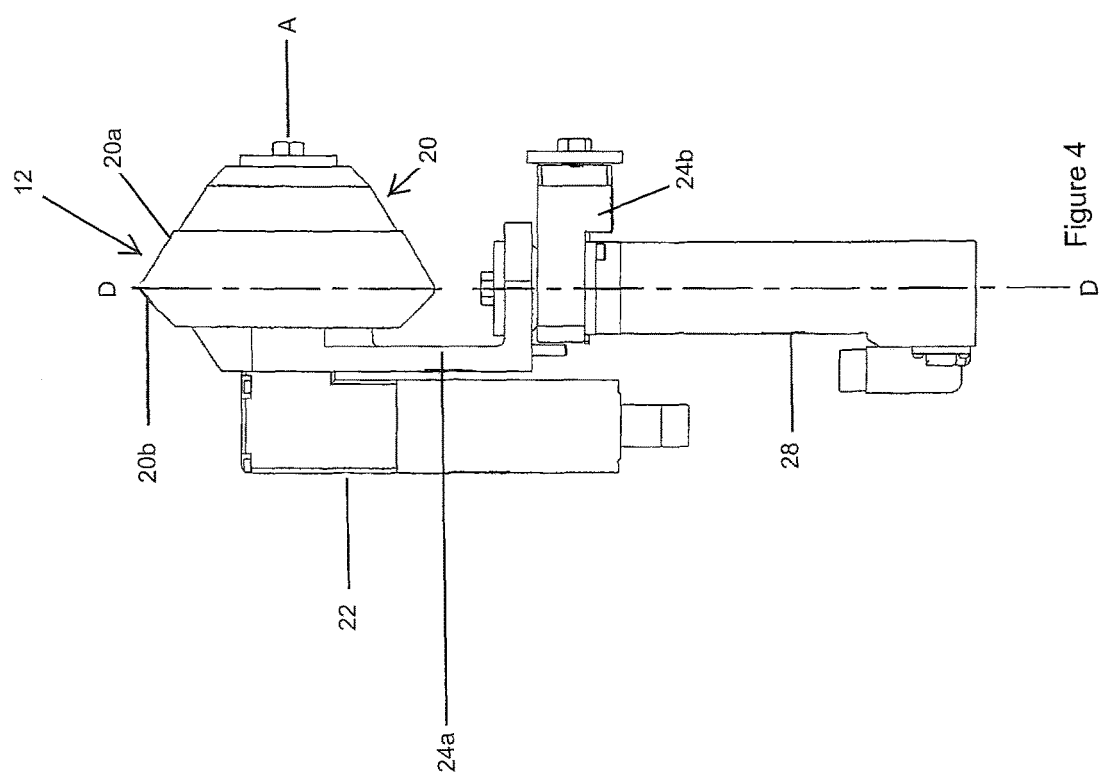

POSITIONING TABLE

CROSS REFERENCE TO RELATED APPLICATIONS

This application claims priority from the U.S. Provisional Patent Application No. 62/085,166 filed on Nov. 26, 2014, entitled: Positioning Table, and also claims priority from U.S. Provisional Patent Application No. 62/185,368 filed on Jun. 26, 2015, entitled: Positioning Table.

FIELD OF THE INVENTION

The present invention is in the technical field of material handling. More particularly, the present invention is in the technical field of piece handling in the lumber and wood industry. This invention relates to a system and apparatus for manipulating workpieces where the workpieces are positioned, transported and accelerated in order to meet downstream equipment requirements.

BACKGROUND OF THE INVENTION

Lumber handling, positioning tables and feeding devices are well-known in the art. The primary drawbacks of the conventional devices are with regard to the drive mechanisms. Conventional planer infeed tables utilize canted screw rolls to move a work piece toward a fixed linebar and under a pineapple press roll. The work pieces are then shifted toward and into the planer machine. After the workpiece has reached the linebar, no further lateral forces are required. However, since the screw rolls also convey the work piece longitudinally, the lateral forces continue to force the work piece against the linebar, thus increasing the friction and drag on the work piece and reducing energy efficiency. Moreover, conventional infeed devices transport and accelerate the work piece in a disorganized manner with little or no control over the forces applied to the work pieces. This result in excessive damage to the pieces of lumber owing to the unnecessary shear forces applied to the lumber during handling.

While various diverters and re-orienteers are known in the prior art, these systems typically have not been able to perform both functions in a compact and efficient manner.

Applicant is aware of the United States Patent Application No. US 2005/0040009 entitled "Steerable Diverter System" to Ehlert, which discloses a diverter system for diverting articles being conveyed along the diverter system, which includes a plurality of diverter wheels arranged between opposite sidewalls of the diverter system. The diverter system comprises a motorized roller positioned generally beneath a row of diverter wheels and operable to rotatably drive the diverter wheels via respective ones of a plurality of drive members or bands around the motorized roller and the diverter wheels. The system may include a rack and pinion type steering system that may steer or pivot or rotate one or more rows of diverter wheels, generally in unison, in response to the rotation or pivotal movement of a pinion or drive or spur gear. The motorized roller may drive more of the wheels independently via the bands around the motorized roller and the wheels, while the shorter idler roller may drive fewer wheels via bands. In addition, rotation of the roller portion of motorized roller drives the drive members to move around the motorized roller and to independently and separately or individually rotatably drive each of the diverter wheels of row that may be positioned generally above and along the motorized roller.

The present invention was developed in order to overcome these and other drawbacks of the prior devices by providing an improved positioning table which comprises of an array of independently controlled positioning devices. The positioning devices are arrayed such that no single device supports multiple workpieces, allowing for simultaneous and independent control of each workpiece.

Among the several advantages of the present invention, it may be noted that the position and/or orientation and/or velocity and/or acceleration of individual workpieces can be actively measured and/or inferred. Other objects and features of the invention will be in part apparent and in part pointed out herein-after.

SUMMARY OF THE INVENTION

The present invention in one aspect includes a material handling system comprised of an array of independently controlled positioning devices, and in another aspect may be characterized as the positioning devices themselves and the method of using the system. The present invention may thus in one embodiment be a positioning table used to support and manipulate the attributes including the position, orientation, velocity and/or acceleration, of one or more workpieces such as cants, flitches, boards, trim blocks, sheets or other workpieces for transport and manipulation as better described below. The positioning devices in the array are arrayed such that no single positioning device supports multiple that is, more than one workpiece at a time thereby allowing for simultaneous and independent control of each workpiece.

In preferred embodiments of the system a set of attributes of each workpiece, such as the position, orientation, velocity and/or acceleration of individual workpieces, are actively measured and/or inferred and corresponding feedback or information relating to the attributes of each workpiece are provided to a system processor. The processor determines the required attributes of each workpiece and related programmable logic controllers actuate the system in real time so as to adjust the attributes on-the-fly as each workpiece is transported and manipulated for optimal disposition or treatment in downstream equipment such as, for example, lug loaders or other machine centres found for example in a saw-mill. Examples of such applications are provided below.

In one aspect the invention may be characterized as a workpiece positioning device which includes an independently actuable first motor mounted on a swivelling support, where the swivelling support is rotatably mounted on a base for rotation of the swivelling support relative to the base about a substantially vertical axis of rotation, and where a workpiece driver is rotatably mounted on the swivelling support and cooperates with the first motor for rotation of the workpiece driver by the first motor about a second axis of rotation lying substantially in a horizontal plane. The workpiece driver has a continuous and continuously rotatable workpiece engaging surface adapted to frictionally engage a workpiece when thereon as the workpiece driver is selectively rotated by the first motor about the second axis of rotation. Thus, the workpiece driver may include an outer, friction enhancing surface. An independently actuable second motor selectively rotates the swivelling support about the first axis of rotation. The first and second motors are actuable independently of each other.

The workpiece driver may be chosen from the group including: a wheel, a sphere, a cone, a frusto-conical wheel, an endless chain, an endless belt, an endless track, intermeshed sprockets, a roll, a sprocket and a chain, and a belt and sheaves.

Preferably the second motor is mounted on the base. The first motor may include a drive shaft, which may be horizontal so as to lie in the horizontal plane, and wherein the workpiece driver is mounted on a distal end of the drive shaft.

The invention may also be characterized as a workpiece positioning system comprising at least one two-dimensional array of the above workpiece positioning devices, wherein the positioning devices are operatively positioned relative to the horizontal plane. At least one control system may be used to control selective actuation of the first and second motors to selectively control attributes of at least one workpiece engaged on the array. The control system may include a processor which compares the attributes to desired attributes including position, velocity, acceleration, orientation of the workpieces and adjusts input, independently of one another, to the first and second motors for the positioning devices in the array corresponding to each of the workpieces. The inputs may selectively control rotational velocity and acceleration of: (a) the workpiece driver about the second axis of rotation; and (b) the swivelling support about the first axis of rotation, so as to independently manipulate each of the workpieces independently of one another into corresponding desired attributes. The desired attributes may be determined in the processor to optimize a machine center operating on the workpieces.

The workpieces are urged by the positioning devices along a flow direction over the array from an upstream position entering the array to a downstream position exiting the array. The machine center is downstream of the array.

The system may include feedback sensors detecting at least one position attribute of the attributes of the workpieces when on the array. The feedback sensors provide information to the processor relating to the attributes of the workpieces, whereby the processor adjusts the attributes of the positioning devices. Advantageously the attributes of the workpieces and the positioning devices include position, velocity and acceleration. Further advantageously the positioning devices in the array are mounted spaced-apart according to a spacing density which is adapted so that each corresponding workpiece driver only supports thereon one workpiece at any one time. Each workpiece is thereby independently manipulatable on the array independently of other workpieces. Preferably a minimum of three workpiece drivers support each workpiece at any one time.

The invention may also be characterized as a method of positioning workpieces using the above system. The method includes determining the attributes of each workpiece on the array, determining the desired attributes corresponding to each workpiece; and, adjusting the attributes of the positioning devices in the array to urge the workpieces to attain their desired attributes so as to optimize operations of the machine center.

BRIEF DESCRIPTION OF THE DRAWINGS

The drawings forming part of this specification contain illustrative views which are not intended to be limiting, wherein the reference numerals denote in each view corresponding parts, axes and direction or velocity or acceleration as the case may be; and wherein:

FIG. 4 is a side view of the positioning device of FIG. 3.

FIG. 4a is a side view of a further embodiment of a positioning device.

DETAILED DESCRIPTION OF EMBODIMENTS OF THE INVENTION

The descriptions of the workpiece positioning system employing an array of individual positioning devices, the positioning devices themselves, and the method of using the system, individually and collectively referred to herein as the invention or present invention, are intended to be read in conjunction with the accompanying drawings. The embodiments of the invention are intended to be for illustrative purposes and are not intended to limit the scope or use of other embodiments of the invention.

Figure 1:
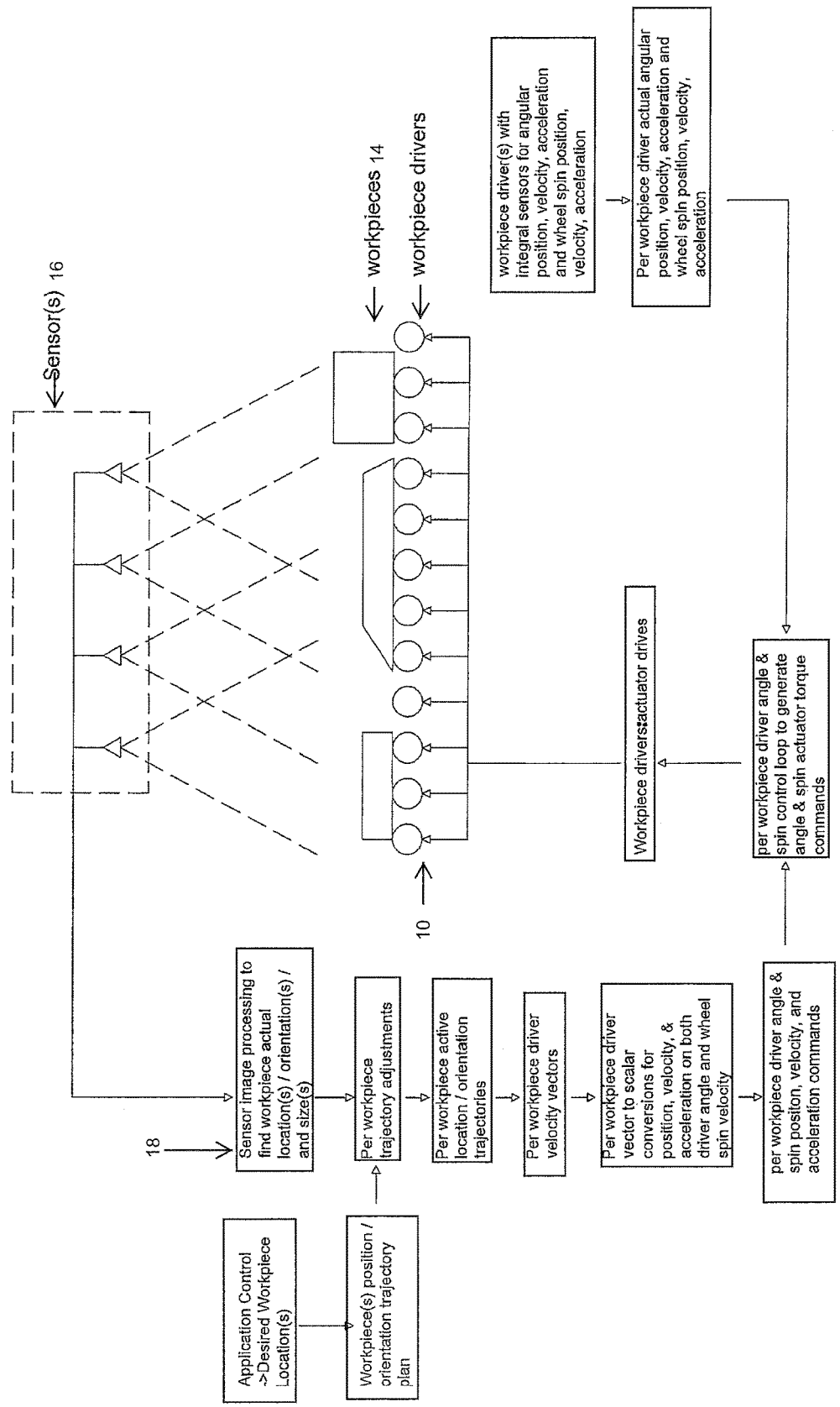
FIG. 1 is a logic flow diagram of one embodiment of the positioning table system process control.

As seen in FIG. 1, a positioning table 10 includes an array of positioning devices 12. Each positioning device 12 is independently controlled by the system processor and its programmable logic controllers. Each positioning device 12 is located sufficiently close to adjacent positioning devices 12 to create a support surface, whether or not used in conjunction with a plate such as described below, that supports one or more workpieces 14 on the vertices of corresponding positioning devices. The surface area density of the vertices or other workpiece engaging part of the positioning devices on the support surface; that is, how closely in proximity adjacent positioning devices 12 are to one another, depends on the nature of the workpieces 14 being transported on positioning table 10; for example, depends on the dimensions of the workpieces. At the workpiece engaging vertices of each positioning device, where the positioning device engages a workpiece, the contact surface between the positioning device 12 and the workpiece 14 supports only a single workpiece 14. The positioning table 10 thus allows for simultaneous and independent control of attributes such as position, orientation, velocity, and/or acceleration of one or more workpieces 14. The workpiece engaging drivers of the workpiece positioning devices each may include a surface for example the vertice of a wheel, or sphere, or frusto-conical surface, or for example may also include the upper-most surface of for example small-loop endless chains, belts, tracks or the like.

Referring now to the control and feedback structure according to one aspect of the invention, the tracking and positioning of a workpiece 14 on table 10 may be enabled through an open-loop control algorithm in the system processor. Friction between the workpiece engaging surfaces of the positioning devices and the workpiece enable the control of position, orientation, velocity, and/or acceleration of the engaged workpiece. In one embodiment those attributes (position, orientations, velocity, acceleration) are inferred or predicted by monitoring the magnitude of the actuation of the positioning devices (for example, assuming no slippage between the workpiece engaging surfaces of devices 12 and the workpiece 14). Alternatively, a closed-loop algorithm, such as seen by way of example in FIG. 1 may be used, wherein an external sensor or sensors 16 provide feedback to the processor 18, such as non-contact sensors including, for example, cameras, laser-diode or photo-eye based sensors, located and orientated as would be known to one skilled in the art. For example, non-contact sensors 16 may be orientated to look downwardly from above table 10, or along a fence line, etc., such that the attributes of each workpiece 14 on table 10 can be determined and accurately controlled by a control system in processor 18 including associated programmable logic controllers (PLC's). Sensors 16 may be an array of discrete sensors, one or more area or line sensors or any other sensing devices that provide attribute feedback to processor 18 for example as seen in FIG. 1, and as would be known to one skilled in the art.

Figure 2:
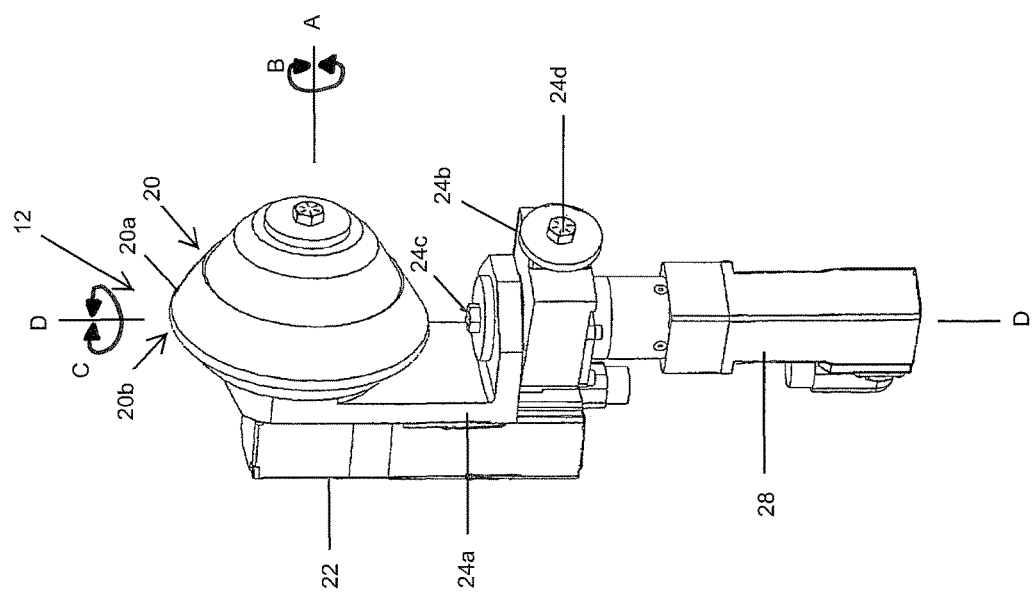
FIG. 2 is a front perspective view of a single positioning device of the array of FIG. 1.
Figure 3:
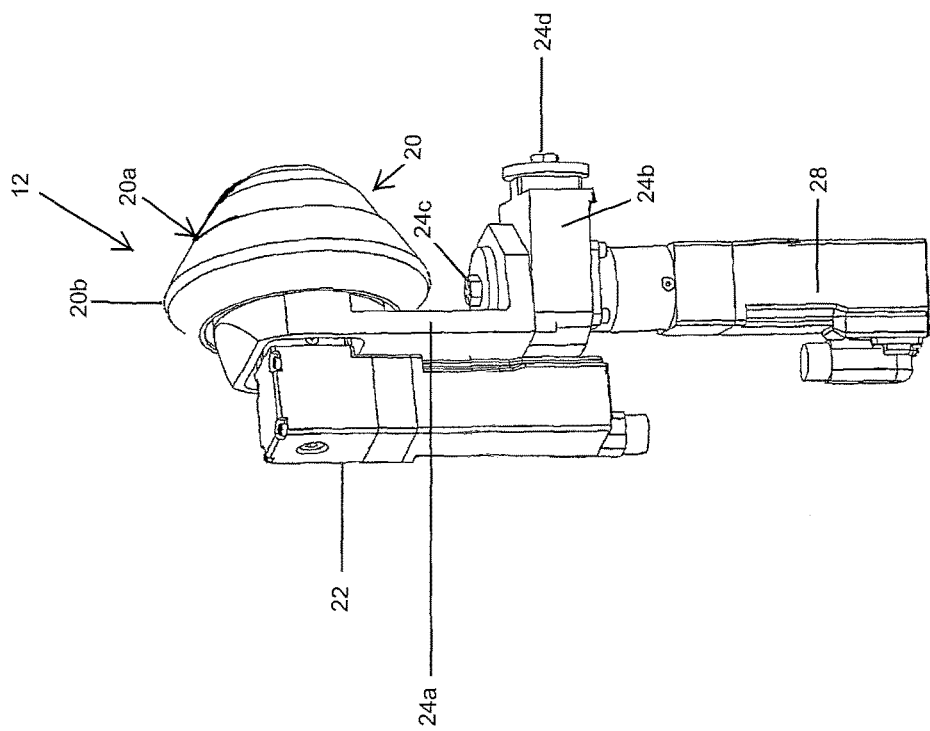
FIG. 3 is a rear perspective view of the device of FIG. 2.

As seen in FIGS. 2, 3 and 4, each positioning device 12 includes a workpiece driver. In the illustrated embodiment of FIGS. 2-4 the workpiece driver includes a frusto-conically shaped wheel 20. Wheel 20 is connected to a spin motor 22 by a drive shaft and gearing (not shown). Spin motor 22 drives rotation of wheel 20 about axis of rotation A so as to control the angular velocity of wheel 20 in direction B about axis of rotation A. The spin motor 22 is mounted on a swivelling support 24a, which may be the illustrated L-shaped bracket or other form of rigid support member. The L-shaped bracket may provide an offset so that the vertice of wheel 20 lies on axis of rotation D. Swivelling support 24a is rotatably mounted onto base 24b, for example by means of a pivot pin or shaft 24c aligned along axis D. In FIG. 4a the vertical axis D' containing the vertice of wheel 20 is offset horizontally from axis D so that as support 24a is rotated about axis D, the vertice of wheel 20 follows a circular arc in its corresponding, horizontal plane F. Thus, although the embodiment in FIGS. 2-4 show the axis of rotation D passing through the workpiece contact point (the vertice of the wheel), there is no requirement for it to do so. The contact point may be offset from the axis of rotation D so that the contact point swings through a horizontal arc as the workpiece driver rotates about axis D. In this case the control system is able to compensate for the movement of the contact point by appropriately adjusting the spin speed of the wheel about axis A.

However, the preferred embodiment is to align the contact point with the axis of rotation D as in FIG. 4 so as to reduce the minimum spacing in the array of devices 12 and thereby to increase the spatial density of the array, and to simplify the control system.

Figure 9:
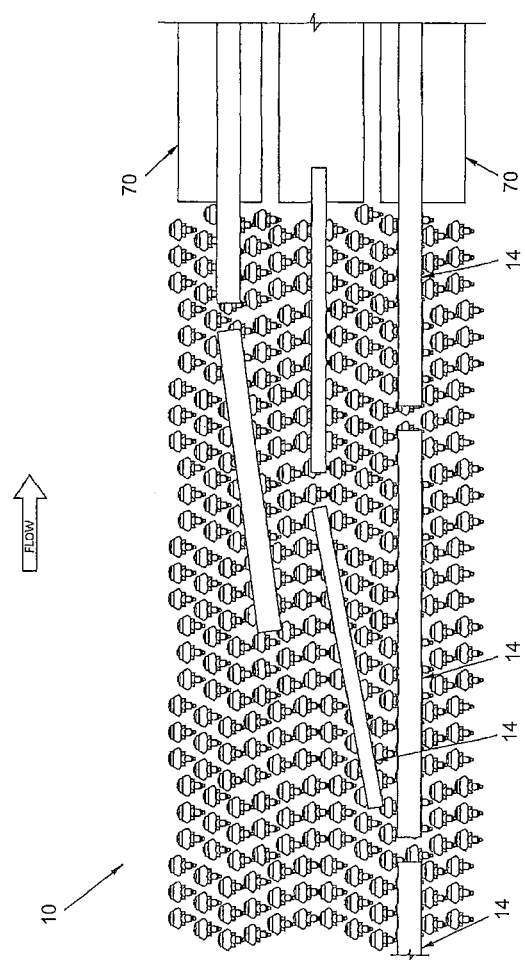
FIG. 9 is a top view of a lineal feed, sorter and diverter employing an embodiment of the array of FIG. 5.

Positioning device 12 may be mounted onto structural frame 26, seen in FIG. 9 by means of a fastener 24d. Fastener 24d may be a bolt as illustrated, although this is not intended to be limiting. The array of devices 10 are mounted on frames 26. In one embodiment, base 24b may also serve as a mounting platform for a pivot motor 28, although it is not intended that motor 28 must necessarily be mounted to base 24b, as it may for example be mounted to frame 26. Pivot motor 28 controls the orientation, angular velocity and acceleration in direction C of the spin motor 22 and wheel 20 assembly about axis D. The spin motor 22 and the pivot motor 28 may each be a servo motor or any other rotating device able to selectively provide controlled and variable velocity and position about axes A and D respectively. Motors 22, 28 may be powered and controlled via electric, hydraulic, or pneumatic means as would be known to one skilled in the art.

Wheel 20, which is just one example of a workpiece driver that may be employed in a positioning device 12 according to the present invention, may be made of metal or any other sufficiently rigid and strong material such as, but not limited to, high-strength plastic. The friction-enhancing contact surface 20a of wheel 20 may be made of rubber, metal or any other material that provides a coefficient of friction that allows for sufficient acceleration of the workpiece without excessive, or preferably any, slippage between contact surface 20a and a workpiece 14 engaged on for example vertice 20b of contact surface 20a.

Figure 12C:
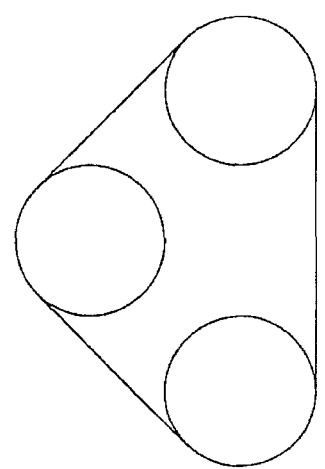
FIG. 12c is a further embodiment of a workpiece driver employing a belt and three sheaves, and having a short contact surface.
Figure 12E:
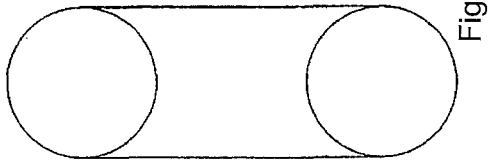
FIG. 12e is a further embodiment of a workpiece driver employing a belt and two sheaves, and having a short contact surface.
Figure 12B:
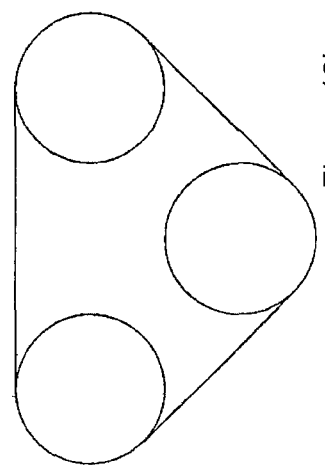
FIG. 12b is a further embodiment of a workpiece driver employing a belt and three sheaves, and having a long contact surface.
Figure 12D:
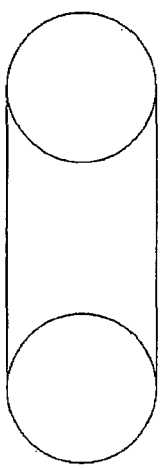
FIG. 12d is a further embodiment of a workpiece driver employing a belt and two sheaves, and having a long contact surface.
Figure 12A:
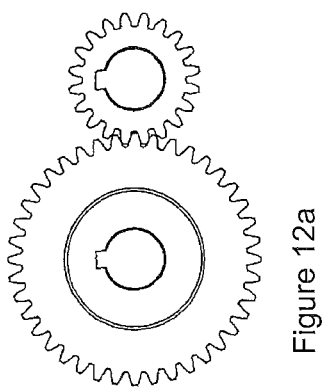
FIG. 12a is a further embodiment of a workpiece driver employing sprockets.

In alternative embodiments of positioning device 12, further workpiece drivers may include a revolving mechanism other than a wheel 20. For example, and without intending to be limiting, a workpiece driver may include inter-meshed sprockets such as seen in FIG. 12a, or for example a roll, or a sprocket and chain, or for example the sheave and belt arrangements of FIGS. 12b-12e, wherein at least one of the rotating elements is driven.

Figure 13:
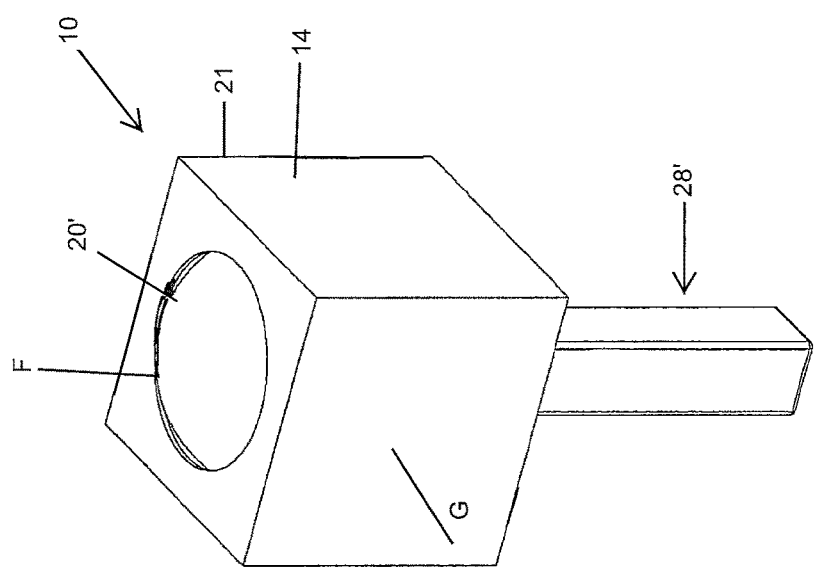
FIG. 13 is, in perspective view, a spherical workpiece driver mounted in a housing.
Figure 13A:
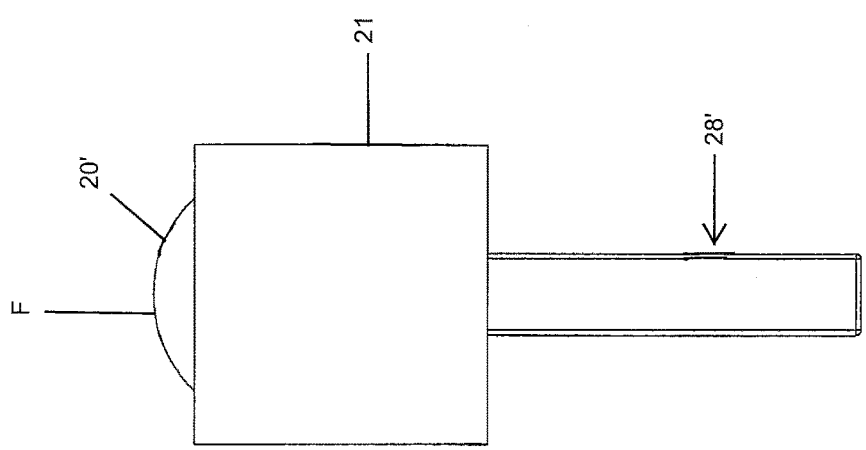
FIG. 13a is, in side view, the workpiece driver and housing of FIG. 13.
Figure 14:
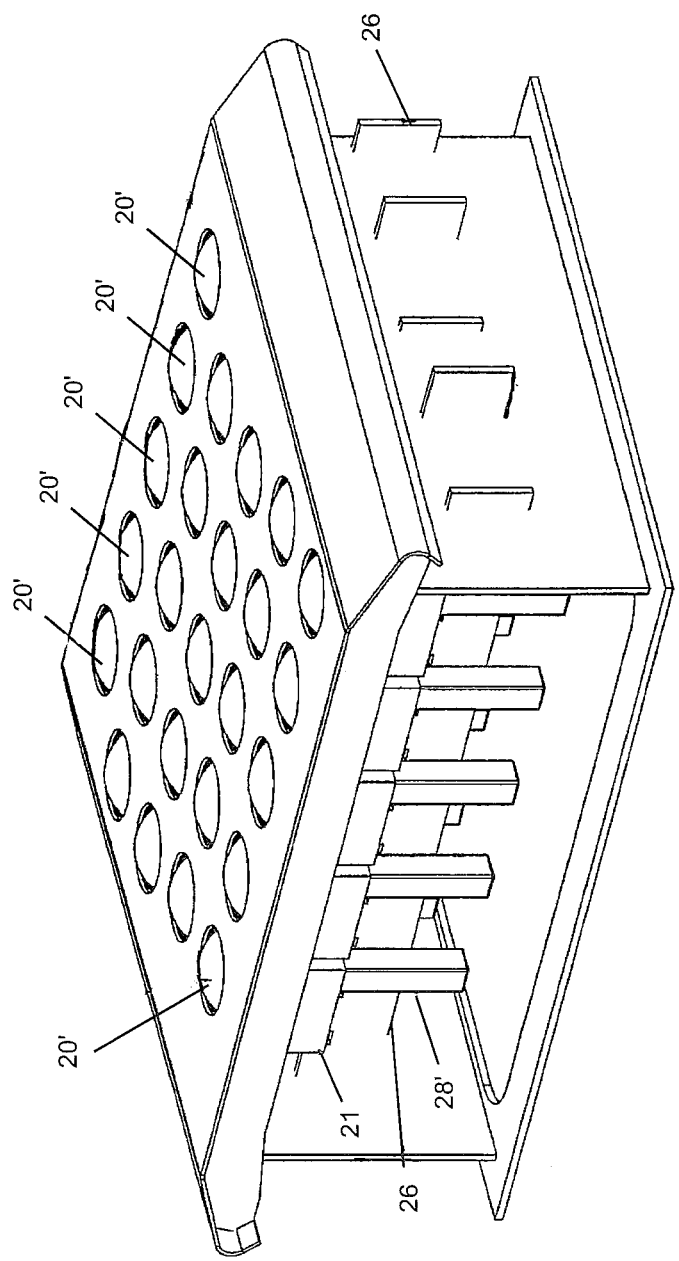
FIG. 14 is, in perspective view, an array of the workpiece drivers of FIG. 13 mounted on a frame under an apertured cover sheet.

In other embodiments of positioning device 12, the orientation of the spin motor 22 and wheel 20 about axis D may be fixed. In another embodiment of positioning device 12 the workpiece driver may as seen in FIGS. 13, 13a, be a single driven sphere 20' supported for rotation in housing 21. Sphere 20' has controlled axes of rotation F, G, H, and correspondingly controlled rotational acceleration and velocity about those axes driven by motor or motors 28'. In one embodiment a bed of small independently controlled and independently driven spheres 20', as seen by way of example in FIG. 14, are arranged in a close pitched array, whereby many of spheres 20' are in simultaneous contact with a workpiece 14.

The arrangement of the array of individual workpiece drivers in the workpiece positioning table 10 is done so as to maintain at all times a minimum three points of contact with the smallest workpiece anticipated, and to ensure the center of the mass of the smallest workpiece is at all times within the region of a triangle described by the minimum three contact points, for the entire range of workpiece motion in the linear, translation, and rotational directions.

Figure 5:
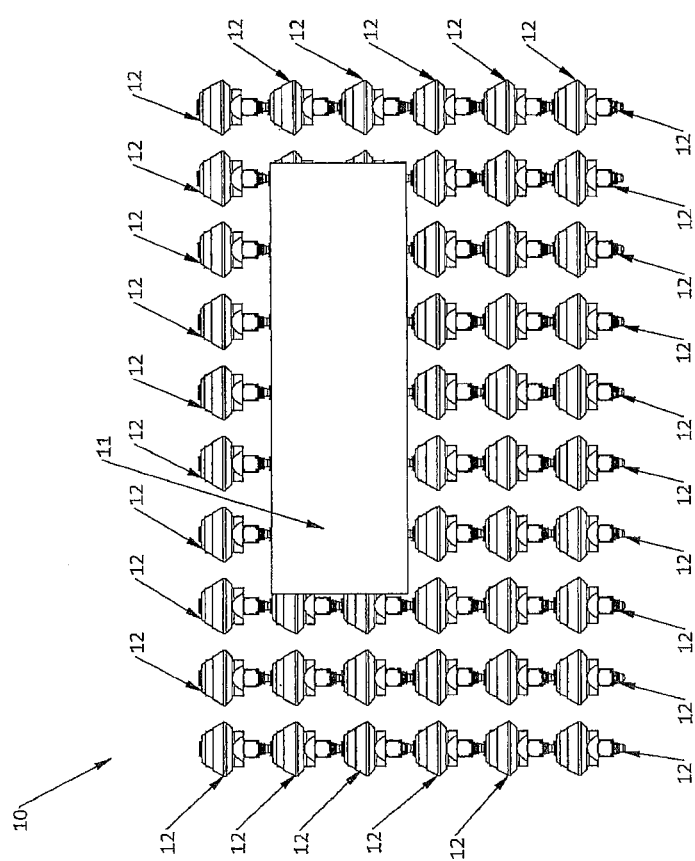
FIG. 5 is a top view of a positioning table containing an array of positioning devices.
Figure 6:
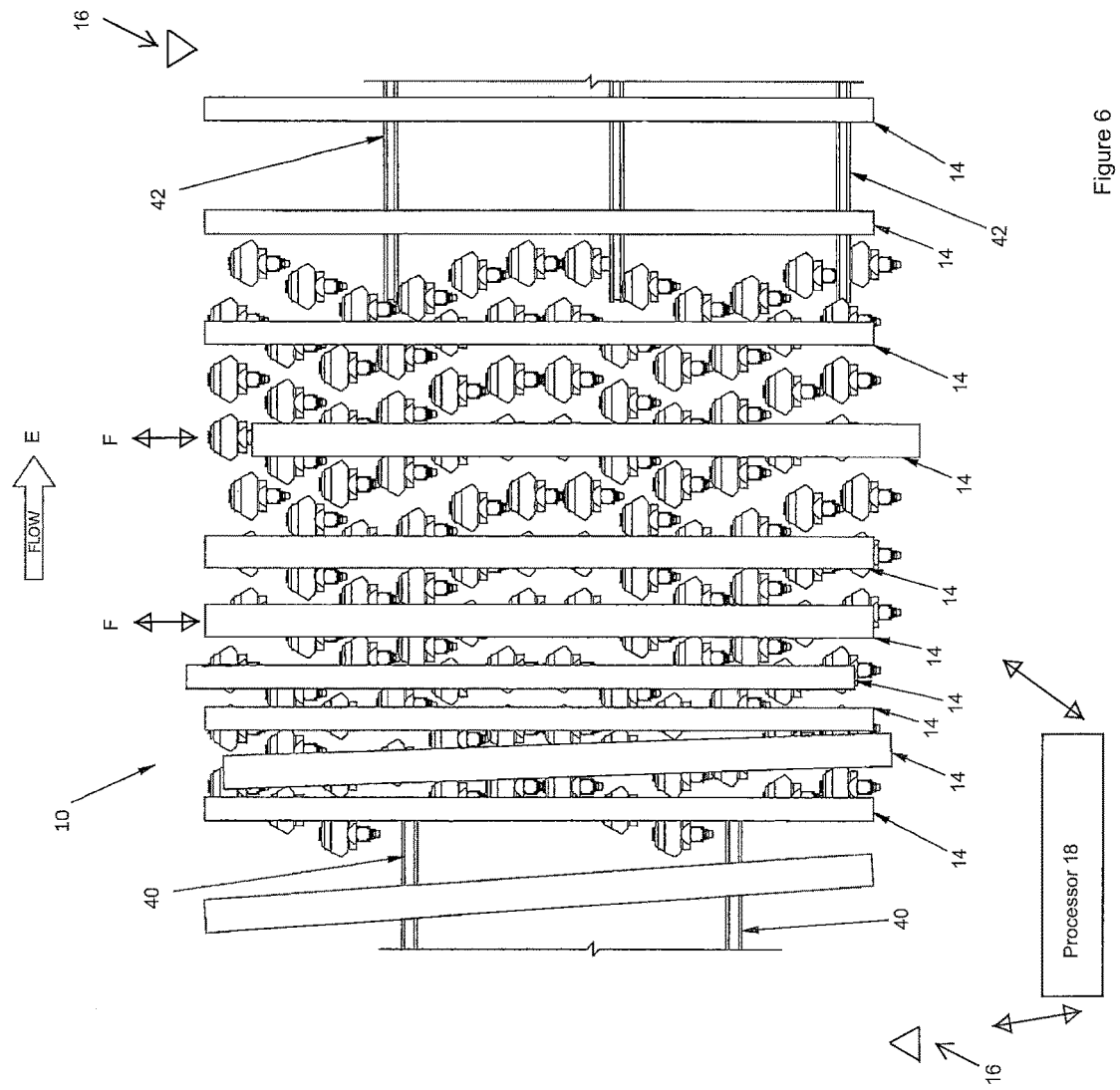
FIG. 6 is a top view of a lug loader employing an embodiment of the array of FIG. 5
Figure 8:
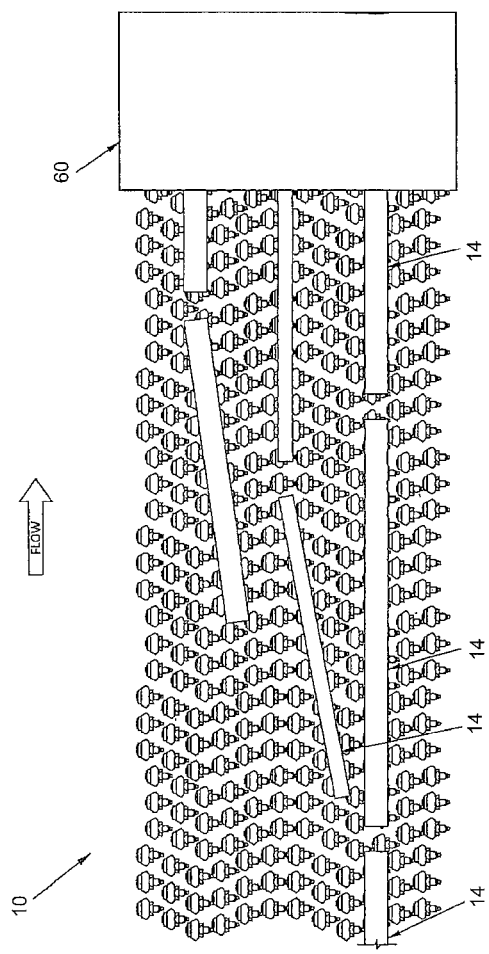
FIG. 8 is a top view of a lineal machine centre infeed employing an embodiment of the array of FIG. 5.

In order to minimize the two-dimensional spacing between workpiece drivers, the workpiece drivers can be nested in a non-grid pattern such as shown in FIGS. 6 and 8. Other patterns such as the grid in FIG. 5 may also be used dependent on the shape and dimensions of the workpiece and the expected path of motion of the workpiece. Additionally the array pattern may be varied so as to allow the ingression of chain runs, belts, rollers or other means of introducing and removing workpieces from the positioning table.

What follows are examples, not intended to be limiting, of various applications of positioning table 10.

As seen in FIG. 6, positioning table 10 transports and positions individual workpieces 14 from an infeed transfer 40 into individual lug spaces on the lugged chains 42. Workpieces 14 may, for example, be lumber.

While individual workpieces 14 are transported in flow direction E across positioning table 10, the attributes (for example, position, orientation, velocity and/or acceleration) of the workpiece 14 are controlled by controlling the positioning devices 12 in the array of devices 12 on table 10 such that workpiece 14 is transferred into the desired and targeted lug space. Preferably, positioning table 10 positions workpieces 14 such that the ends of workpiece 14 are optimally located in their lateral position across lugged chains 42. It is understood that, although only two direction arrows F are shown in FIG. 6, that position adjustments such as direction F on table 10 are seamless or continuous for any one workpiece and may be simultaneous between individual workpieces 14.

Figure 7:
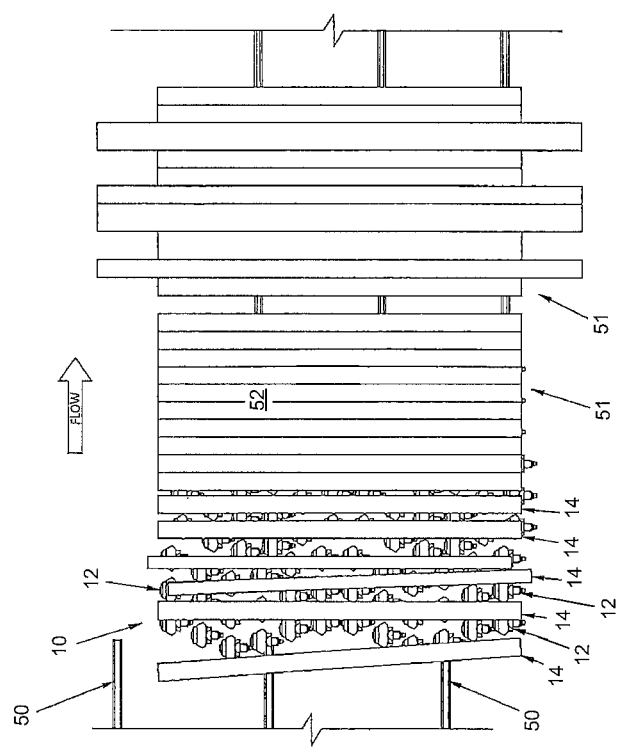
FIG. 7 is a top view of a tier-forming apparatus employing an embodiment of the array of FIG. 5.

As seen in FIG. 7, positioning table 10 transports and positions individual workpieces 14 from an infeed transfer 50 to create a tier 52 of workpieces 14. The individual workpieces 14 in the tier 52 may be selectively aligned or otherwise positioned in the tier by operation of the array of positioning devices 12. Thus, as workpieces 14 are transported in direction E across positioning table 10, the attributes such as position, orientation, velocity, and/or acceleration of individual workpieces 14 are controlled such that tier 52 is formed. Again, the array of positioning devices 12 that comprise positioning table 10 may also adjust workpiece position such that all workpieces are optimally located for the downstream machine centre operation on workpieces 14. For example, where workpieces 14 within a tier 52 are of the same length, the ends 14a of workpieces 14 would typically be aligned. However, when workpieces 14 within a tier 52 are of differing dimensions, and in particular, differing length dimensions, the ends of the workpieces 14 would be optimally arranged according to downstream processing requirements, for example as to negate the need for a fence and ending rolls, etc.

As seen in FIG. 8, a positioning table 10 supplies workpieces 14 to a machine centre 60. Machine centre 60 may, for example, be a gang saw or edger saw box with fixed or shifting saws. As positioning table 10 transports the workpieces 14 to the machine centre 60, the positioning table 10 also manipulates or adjusts the attributes of the workpieces, for example the position, orientation, velocity, and/or acceleration of workpieces 14, such that workpieces 14 are optimally positioned for processing by machine centre 60 according to optimized positions determined by an optimizer or optimizing software in processor 18. Workpieces 14 may, for example, be positioned such that a continuous feed of workpieces 14 are supplied to machine centre 60. In one application, workpieces 14 may for example be positioned such that multiple workpieces 14 are simultaneously processed by machine centre 60. The spacing between workpieces 14 and orientation of successive workpieces 14 may be adjusted such that downstream processing throughput is maximized.

As seen in FIG. 9, positioning table 10 transports workpieces 14 to a number of parallel transfers 70. In this application, the primary purpose of the positioning table 10 is sorting and diverting workpieces 14 by manipulating or adjusting the attributes such as the position, orientation, velocity and/or acceleration of workpieces 14.

Figure 10:
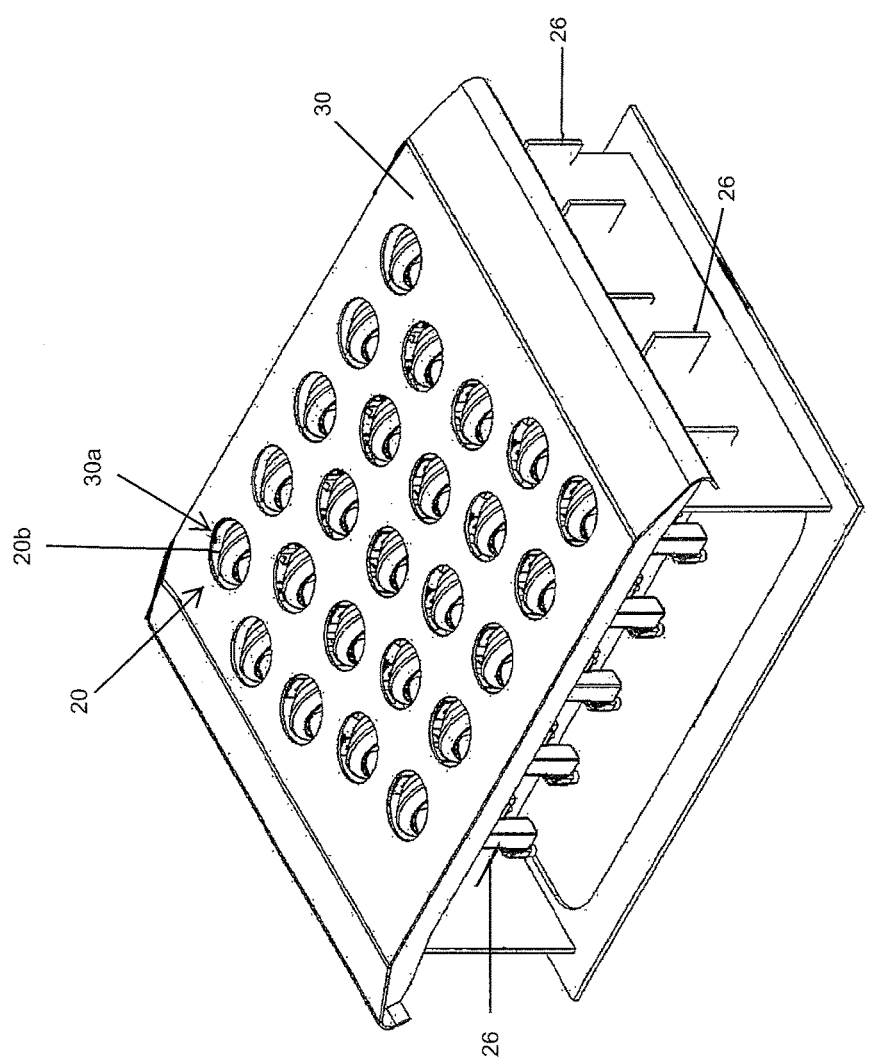
FIG. 10 is in top, rear perspective view the array of FIG. 5 with the positioning devices mounted on a supporting frame and covered with an apertured cover sheet.

As seen in FIG. 10, the two dimensional array of positioning devices 12 may be mounted on frame members 26. Frame members 26 may be covered by an apertured plate 30. Plate 30 provides a surface inhibiting workpieces 14 or detritus from falling or catching in-between individual positioning devices 12. Positioning devices 12 are aligned on frame members 26 under apertures 30a in plate 30, and positioned so that wheels 20 protrude upwardly through the apertures so as to position vertices 20b above the plane of the upper surface of plate 30.

In the case of lumber, the workpieces 14 passing over the positioning table 10 vary in size from for example 0.75 inches ×2.5 inches ×6 feet, to 185 mm ×24 feet, and for example in the application of FIG. 6 load into the lug spaces at for example 100 in/sec, accelerating at for example 200 in/sec/sec at a rate of five workpieces per second. However, the workpiece sizes, running speeds, and operating rates are not definitive and are dependent on the specific positioning table application.

The workpiece drivers may be installed in a dirty industrial environment and subject to significant dust, sawdust in the case of lumber, debris from broken workpieces, and falling workpieces should a workpiece be dropped on the positioning table. Additionally the positioning table may be walked on for maintenance, operational, or cleaning purposes. The workpiece driver should continue to function correctly in all such instances.

Additionally, although not illustrated, the workpiece drivers may also move vertically, either individually or in groups. Vertical driver positioning may be done to compensate for vertical variations in the transport surface of the workpiece so as to better maintain contact with an irregular workpiece. Alternatively the drivers may be selectively raised or lowered to pick workpieces from or set workpieces onto other transport means such as chains, rolls and belts.

In FIG. 10, the workpiece drivers within a positioning table 10 are shown beneath a cover sheet 30. This sheet may be installed to provide additional protection to the workpiece drivers in harsh environments. The cover may be simply lifted off using built-in handles or other means to facilitate maintenance or cleaning.

Figure 11:
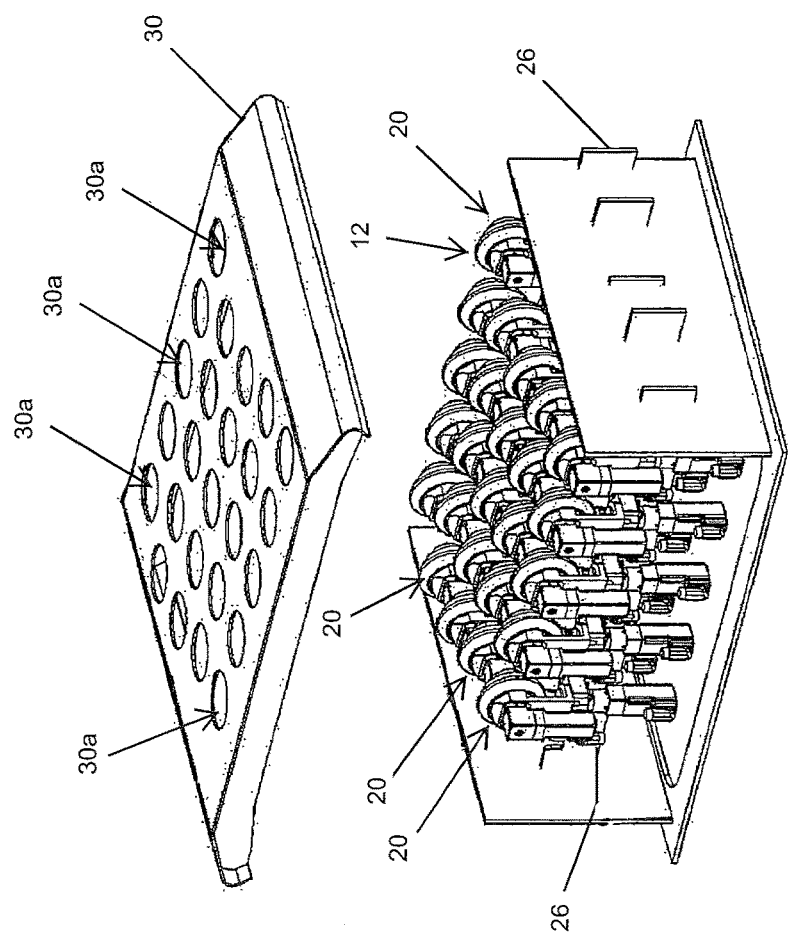
FIG. 11 is the view of FIG. 10 with the apertured cover sheet elevated off the array of positioning devices.
Figure 11A:
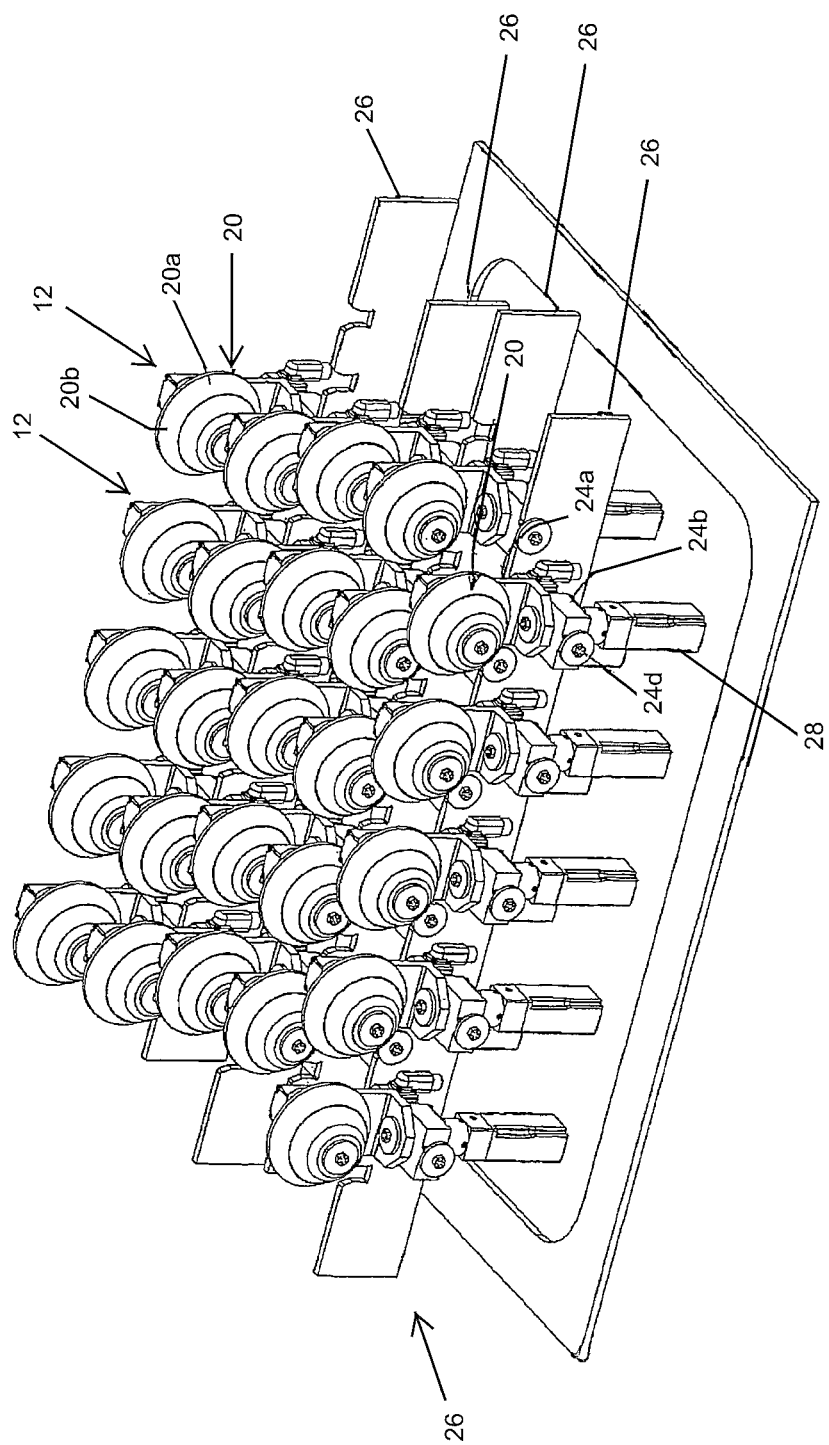
FIG. 11a is, in front perspective view, the view of FIG. 11 with the cover sheet removed.

FIG. 11 shows the workpiece drivers mounted to the base frame member via a simple bolt and slot arrangement. Electrical connections are via simple connectors. Advantageously, each workpiece driver in the positioning table is identical and may be easily and quickly removed and replaced for maintenance.

While the foregoing written description of the invention enables one of ordinary skill to make and use what is considered presently to be the best mode thereof, those of ordinary skill will understand and appreciate the existence of variations, combinations, and equivalents of the specific embodiment, method and examples herein. The invention should therefore not be limited by the above described embodiment, method, and examples, but by all embodiments and methods within the scope and spirit of the invention.

Various aspects of the invention are defined in the following claims.

What is claimed is:

1. A workpiece positioning device comprising:
    an independently actuable first motor mounted on a swivelling support,
    said swivelling support rotatably mounted on a base for rotation of said swivelling support relative to said base about a substantially vertical first axis of rotation,
    a workpiece driver rotatably mounted on said swivelling support and cooperating with said first motor for rotation of said workpiece driver by said first motor about a second axis of rotation lying substantially in a horizontal plane, said workpiece driver having a continuous and continuously rotatable workpiece engaging surface, said workpiece engaging surface adapted to frictionally engage a workpiece when thereon as said workpiece driver is selectively rotated by said first motor about said second axis of rotation,
    an independently actuable second motor selectively rotating said swivelling support about said first axis of rotation,
    wherein said first and second motors are actuable independently of each other.

2. The device of claim 1 wherein said workpiece driver is chosen from the group comprising: a wheel, a sphere, a cone, a frusto-conical wheel, an endless chain, an endless belt, an endless track, inter-meshed sprockets, a roll, a sprocket and chain, a belt and sheaves.

3. The device of claim 1 wherein said workpiece drive includes an outer, friction enhancing surface.

4. The device of claim 1 wherein said second motor is mounted on said base.

5. The device of claim 1 wherein said first motor includes a drive shaft, wherein said drive shaft is horizontal so as to lie in said horizontal plane, and wherein said workpiece driver is mounted on a distal end of said drive shaft.

6. A workpiece positioning system comprising
    a plurality of workpiece positioning devices, wherein each workpiece positioning device of said plurality of workpiece positioning devices includes an independently actuable first motor mounted on a swivelling support, said swivelling support rotatably mounted on a base for rotation of said swivelling support relative to said base about a substantially vertical first axis of rotation, a workpiece driver rotatably mounted on said swivelling support and cooperating with said first motor for rotation of said workpiece driver by said first motor about a second axis of rotation lying substantially in a horizontal plane, said workpiece driver having a continuous and continuously rotatable workpiece engaging surface, said workpiece engaging surface adapted to frictionally engage a workpiece when thereon as said workpiece driver is selectively rotated by said first motor about said second axis of rotation, an independently actuable second motor selectively rotating said swivelling support about said first axis of rotation, wherein said first and second motors are actuable independently of each other,
    and wherein said plurality of workpiece positioning devices are arranged in at least one two-dimensional array operatively positioned relative to said horizontal plane.

7. The system of claim 6 further comprising at least one control system controlling selective actuation of said first and second motors to selectively control attributes of at least one workpiece engaged on said array.

8. The system of claim 7 wherein said control system includes a processor and wherein said processor compares said attributes to desired attributes including position, velocity, acceleration, orientation of the at least one workpiece and adjusts input, independently of one another, to said first and second motors for said positioning devices in said array corresponding to each of the at least one workpieces.

9. The system of claim 8 wherein said inputs selectively control rotational velocity and acceleration of: (a) said workpiece driver about said second axis of rotation; and (b) said swivelling support about said first axis of rotation, so as to independently manipulate each of the at least one workpieces independently of one another into corresponding said desired attributes.

10. The system of claim 9 wherein the desired attributes are determined in said processor to optimize a machine center operating on the at least one workpieces.

11. The system of claim 10 wherein the at least one workpieces are urged by said positioning devices along a flow direction over said array from an upstream position entering said array to a downstream position exiting said array, and wherein the machine center is downstream of said array.

12. The system of claim 11 further comprising feedback sensors detecting at least a position attribute of the attributes of the at least one workpieces when on said array, wherein said feedback sensors provide to said processor information relating to the attributes of the at least one workpiece, whereby said processor adjusts said attributes of said positioning devices.

13. The system of claim 12 wherein said attributes of the at least one workpieces and said positioning devices include position, velocity and acceleration.

14. The system of claim 11 wherein said positioning devices in said array are mounted spaced-apart according to a spacing density which is adapted so that each corresponding said workpiece driver only supports thereon one workpiece at any one time, whereby each workpiece of the at least one workpieces is independently manipulatable on said array independently of others of the at least one workpieces.

15. The system of claim 14 wherein said workpiece driver is chosen from the group comprising: a wheel, a sphere, a cone, a frusto-conical wheel, an endless chain, an endless belt, an endless track, inter-meshed sprockets, a roll, a sprocket and chain, a belt and sheaves.

16. The system of claim 15 wherein said workpiece driver includes an outer, friction-enhancing surface.

17. The system of claim 16 wherein said second motor is mounted on said base.

18. The system of claim 14 wherein a minimum of three said workpiece drivers support each of said at least one workpiece at any one time.

19. A method of positioning workpieces comprising:
    (a) providing a plurality of workpiece positioning devices, wherein each workpiece positioning device of said plurality of workpiece positioning devices includes having an independently actuable first motor mounted on a swivelling support, said swivelling support rotatably mounted on a base for rotation of said swivelling support relative to said base about a substantially vertical first axis of rotation, a workpiece driver rotatably mounted on said swivelling support and cooperating with said first motor for rotation of said workpiece driver by said first motor about a second axis of rotation lying substantially in a horizontal plane, said workpiece driver having a continuous and continuously rotatable workpiece engaging surface, said workpiece engaging surface adapted to frictionally engage a workpiece when thereon as said workpiece driver is selectively rotated by said first motor about said second axis of rotation, an independently actuable second motor selectively rotating said swivelling support about said first axis of rotation, wherein said first and second motors are actuable independently of each other, and wherein said plurality of workpiece positioning devices are arranged in at least one two-dimensional array operatively positioned relative to said horizontal plane, and further comprising at least one control system controlling selective actuation of said first and second motors to selectively control attributes of at least one workpiece engaged on said array, wherein said control system includes a processor and wherein said processor compares said attributes to desired attributes including position, velocity, acceleration, orientation of the at least one workpiece and adjusts input, independently of one another, to said first and second motors for said positioning devices in said array corresponding to each of the at least one workpieces, wherein said inputs selectively control rotational velocity and acceleration of: (i) said workpiece driver about said second axis of rotation; and (ii) said swivelling support about said first axis of rotation, so as to independently manipulate each of the at least one workpieces independently of one another into corresponding said desired attributes, wherein the desired attributes are determined in said processor to optimize a machine center operating on the at least one workpieces, wherein the at least one workpieces are urged by said positioning devices along a flow direction over said array from an upstream position entering said array to a downstream position exiting said array, and wherein the machine center is downstream of said array, and wherein said positioning devices in said array are mounted spaced-apart according to a spacing density which is adapted so that each corresponding said workpiece driver only supports thereon one workpiece at any one time, whereby each workpiece of the at least one workpieces is independently manipulatable on said array independently of others of the at least one workpieces, (b) determining the attributes of the at least one workpiece on said array, (c) determining the desired attributes of the at least one workpiece, (d) adjusting the attributes of said positioning devices in said array to urge the at least one workpiece to attain the desired attributes so as to optimize operations of the machine center.

\* \* \* \* \*